(12) United States Patent
Bae et al.

(10) Patent No.: US 9,900,649 B2
(45) Date of Patent: Feb. 20, 2018

(54) CONTROL METHOD AND DISPLAY APPARATUS PROVIDING VARIOUS TYPES OF CONTENT

(71) Applicant: SAMSUNG ELECTRONICS CO., LTD., Suwon-si (KR)

(72) Inventors: Hee-jeong Bae, Yongin-si (KR); Yong-hwan Kwon, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/721,632

(22) Filed: May 26, 2015

(65) Prior Publication Data

US 2015/0256889 A1    Sep. 10, 2015

Related U.S. Application Data

(63) Continuation of application No. 13/710,972, filed on Dec. 11, 2012, now Pat. No. 9,602,861.

(30) Foreign Application Priority Data

Dec. 14, 2011    (KR) .................. 10-2011-0134222

(51) Int. Cl.
*G06F 3/00* (2006.01)
*H04N 21/431* (2011.01)
(Continued)

(52) U.S. Cl.
CPC ....... *H04N 21/4316* (2013.01); *G06F 3/0482* (2013.01); *G06F 3/04817* (2013.01);
(Continued)

(58) Field of Classification Search
CPC ......... H04N 21/4333; H04N 21/47217; H04N 21/482
See application file for complete search history.

(56) References Cited

U.S. PATENT DOCUMENTS 5,594,509 A    1/1997   Florin et al.
5,737,029 A    4/1998   Ohkura et al.
(Continued)

FOREIGN PATENT DOCUMENTS

CN    1612599 A    5/2005
CN    101119452 A    2/2008
(Continued)

OTHER PUBLICATIONS

Communication dated Jun. 25, 2015 issued by the U.S. Patent and Trademark Office in counterpart U.S. Appl. No. 13/710,972.
(Continued)

*Primary Examiner* — Omar Abdul-Ali
(74) *Attorney, Agent, or Firm* — Sughrue Mion, PLLC

(57) ABSTRACT

A control method and display apparatus for providing various types of content is provided. The display apparatus includes a display unit which displays an image of contents; a storage unit which stores information regarding the contents; a UI generation unit which generates UIs regarding the contents; and a controller which shuts down a first content being executed, storing information regarding the shut down first content and controls generation and display of a UI regarding the first content on the display unit, when running a second content different from the first content, while the first content is running. The control method includes running contents and displaying the contents; running a second content that is different from a first content being run, according to a user input; shutting off the first content before running the second content; storing the first content; and generating and displaying a UI regarding the first content.

13 Claims, 5 Drawing Sheets

(51) Int. Cl.
| | |
|---|---|
| H04N 21/433 | (2011.01) |
| G06F 3/0481 | (2013.01) |
| G06F 3/0482 | (2013.01) |
| G06F 3/0484 | (2013.01) |
| H04N 5/445 | (2011.01) |
| H04N 21/482 | (2011.01) |
| H04N 21/442 | (2011.01) |
| H04N 21/45 | (2011.01) |
| H04N 21/472 | (2011.01) |
| H04N 21/478 | (2011.01) |
| H04N 21/81 | (2011.01) |

(52) U.S. Cl.
CPC ..... *G06F 3/04842* (2013.01); *H04N 5/44543* (2013.01); *H04N 21/4312* (2013.01); *H04N 21/4333* (2013.01); *H04N 21/44222* (2013.01); *H04N 21/4532* (2013.01); *H04N 21/478* (2013.01); *H04N 21/47217* (2013.01); *H04N 21/482* (2013.01); *H04N 21/4821* (2013.01); *H04N 21/8153* (2013.01); *H04N 21/8173* (2013.01); *H04N 2005/44556* (2013.01); *H04N 2005/44573* (2013.01)

(56) References Cited

U.S. PATENT DOCUMENTS

| | | | |
|---|---|---|---|
| 5,835,717 | A | 11/1998 | Karlton et al. |
| 6,141,003 | A | 10/2000 | Chor et al. |
| 8,640,166 | B1 | 1/2014 | Craner |
| 2002/0056098 | A1 | 5/2002 | White |
| 2004/0128700 | A1 | 7/2004 | Pan |
| 2005/0094031 | A1 | 5/2005 | Tecot et al. |
| 2005/0235319 | A1 | 10/2005 | Carpenter et al. |
| 2005/0238317 | A1 | 10/2005 | Horiguchi et al. |
| 2006/0294557 | A1 | 12/2006 | Morris et al. |
| 2007/0192791 | A1 | 8/2007 | Sullivan et al. |
| 2008/0034389 | A1 | 2/2008 | Park |
| 2008/0104521 | A1 | 5/2008 | Dubinko et al. |
| 2009/0132921 | A1 | 5/2009 | Hwangbo et al. |
| 2009/0154898 | A1 | 6/2009 | Barrett et al. |
| 2009/0204929 | A1 | 8/2009 | Baurmann et al. |
| 2010/0083304 | A1 | 4/2010 | Pan |
| 2012/0054803 | A1 | 3/2012 | Lee et al. |
| 2012/0096392 | A1* | 4/2012 | Ording .................. G06F 9/4443 715/783 |
| 2012/0304229 | A1 | 11/2012 | Choi et al. |
| 2012/0331020 | A1 | 12/2012 | Morishita |
| 2014/0281998 | A1 | 9/2014 | Hwangbo et al. |

FOREIGN PATENT DOCUMENTS

| | | |
|---|---|---|
| CN | 100405836 C | 7/2008 |
| EP | 1 528 566 A2 | 5/2005 |
| JP | 8-140003 A | 5/1996 |
| JP | 10-145689 A | 5/1998 |
| JP | 11-32272 A | 2/1999 |
| JP | 2002-519950 A | 7/2002 |
| JP | 2005-51493 A | 2/2005 |
| KR | 10-2009-0050577 A | 5/2009 |
| KR | 10-2010-0030820 A | 3/2010 |
| WO | 2011/115083 A1 | 8/1916 |

OTHER PUBLICATIONS

Communication dated Dec. 24, 2015 issued by the U.S. Patent and Trademark Office in counterpart U.S. Appl. No. 13/710,972.
Communication dated Dec. 4, 2015 issued by the U.S. Patent and Trademark Office in counterpart U.S. Appl. No. 14/849,678.
Communication dated Dec. 18, 2015 issued by the Korean Intellectual Property Office in counterpart Korean Patent Application No. 10-2011-0134222.
Communication dated Jan. 21, 2016 issued by the European Patent Office in counterpart European Patent Application No. 12 197 199.8.
Communication, dated Mar. 27, 2013, issued by the European Patent Office in counterpart European Patent Application No. 12197199.8.
Non-Final Office Action, dated Jul. 24, 2014 in U.S. Appl. No. 13/710,972.
Final Office Action, dated Mar. 3, 2015, in U.S. Appl. No. 13/710,972.
Communication dated Jun. 24, 2016, issued by the Korean Intellectual Property Office in counterpart Korean Patent Application No. 10-2011-0134222.
Communication dated Jul. 8, 2016, issued by the United States Patent and Trademark Office in counterpart U.S. Appl. No. 13/710,972.
Communication dated Jul. 8, 2016, issued by the United States Patent and Trademark Office in counterpart U.S. Appl. No. 14/849,678.
Communication dated Aug. 9, 2016, issued by the Japanese Intellectual Property Office in counterpart Japanese Patent Application No. 2012-272761.
Communication dated Feb. 4, 2017, issued by the State Intellectual Property Office of P.R. China in counterpart Chinese application No. 201210538939.4.
Communication dated Dec. 30, 2016, issued by the Korean Intellectual Property Office in counterpart Korean application No. 10-2011-0134222.
Communication dated Jan. 2, 2017, issued by the European Patent Office in counterpart European application No. 12197199.8.
Communication dated Jul. 3, 2017 issued by the European Patent Office in counterpart European Patent Application No. 12 197 199.8.
Communication dated Jul. 3, 2017 issued by the United States Patent & Trademark Office in counterpart U.S. Appl. No. 14/849,678.
Communication dated Nov. 8, 2017 issued by the Korean Intellectual Property Office in counterpart Application No. 10-2017-0087367.
Communication dated Dec. 4, 2017 issued by the State Intellectual Property of P.R. China in counterpart Application No. 201210538939.4.

* cited by examiner

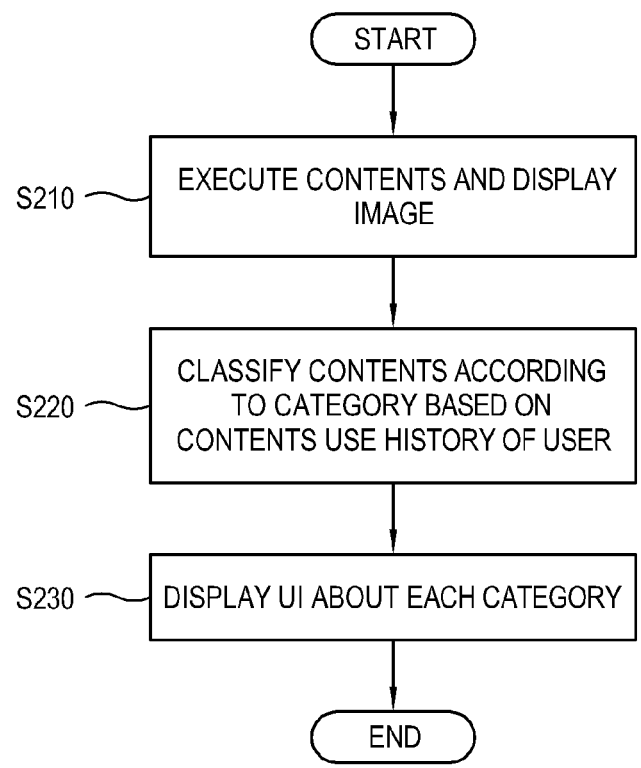

CONTROL METHOD AND DISPLAY APPARATUS PROVIDING VARIOUS TYPES OF CONTENT

CROSS-REFERENCE TO RELATED APPLICATION

This application is a continuation of U.S. application Ser. No. 13/710,972, filed Dec. 11, 2012, which claims priority from Korean Patent Application No. 10-2011-0134222, filed on Dec. 14, 2011 in the Korean Intellectual Property Office, the disclosure of which is incorporated herein by reference.

BACKGROUND

1. Field

Methods and apparatuses consistent with the exemplary embodiments relate to a display apparatus and a control method thereof. More particularly, the exemplary embodiments relate to a display apparatus providing various types of content, and a control method thereof.

2. Description of the Related Art

Conventionally, TVs merely serve to select a broadcast channel and to receive and output broadcast signals transmitted from broadcasting stations via a wire or wireless communication. However, in response to demands of users to utilize various contents, some latest TVs provide a function of executing various contents, such as playing multimedia files from external image sources, running applications including games and music and searching on the Internet, in addition to watching broadcasts.

To utilize desired contents, a user is required to access an application providing the contents. Even with such a function, however, currently released TVs can execute only a single content due to hardware limitations.

Thus, to run a second content while a first content is running, the user experiences the inconvenience of going back to the previously executed first content.

SUMMARY

Accordingly, one or more exemplary embodiments provide a display apparatus, such as TV, which provides an environment which enables users to easily access desired contents.

The foregoing and/or other aspects may be achieved by providing a display apparatus including a display unit which displays an image of contents; a storage unit which stores information regarding the contents; a UI generation unit which generates UIs regarding the contents; and a controller which shuts down a first content being executed, storing, in the storage unit information regarding the shut down first content and controls the UI generation unit to generate and display a UI regarding the first content on the display unit, when running a second content that is different from the first content, while the first content is running. The controller runs the first content when the UI regarding the shut down first content is selected according to user input. The controller resumes execution of the first content at a time of shutting down the first content. The controller displays together the UI regarding the first content and a UI regarding the second content, when executing a third content, different from the first content and the second content, while the second content is running. In addition, the controller classifies the contents according to a category based on user history of contents use and controls display of a UI in each category on the display unit. The controller controls display of a UI regarding at least one content shut down on the display unit. Further, the UIs are displayed in order of latest shut down and the UIs are displayed in order of execution frequency. Moreover, the UIs are displayed as a thumbnail image which corresponds to a screen at a time when the first content is shut down.

The exemplary embodiments further include a display apparatus having a display unit which displays an image of contents; a storage unit which stores information regarding the contents; a UI generation unit which generates UIs regarding the contents; and a controller which controls classifying the contents according to a category based on a user history of contents use and displays a UI in each category on the display unit.

In addition, the controller shuts down a first content when running a second content that is different from the first content while the first content is running. Furthermore, the controller runs a content shut down the most recently from among contents included in the category when the UI in the category is selected according to a user input. Moreover, the controller runs a content executed the most frequently from among contents included in the category when the UI in the category is selected according to a user input.

The exemplary embodiments further include a method of controlling a display apparatus, the method providing for running contents and displaying an image including the contents; running a second content that is different from a first content being run, according to a user input; shutting off the first content before running the second content; storing information regarding the first content; and generating and displaying a UI regarding the first content.

The exemplary embodiments also provide for running the first content when the UI regarding the shut down first content is selected according to a user input and resuming execution of the first content at a time of shutting down the first content.

The exemplary embodiments also provide for displaying together the UI regarding the first content and a UI regarding the second content together when executing a third content, different from the first content and the second content, while the second content is running, and classifying the contents according to a category based on a user history of contents use and displaying a UI in each category on the display unit. The displaying comprises displaying a UI regarding at least one content that has been shut down. The UI is displayed in order of the latest content that has been shut down. Also, the UI is displayed in order of execution frequency. Further, the UI is displayed as a thumbnail image which corresponds to a screen at a time when the first content is shut down.

The exemplary embodiments further provide for a method of controlling a display apparatus, the method including running contents and displaying an image including the contents; classifying the contents according to a category based on a user history of contents use; and displaying a UI in each category on a display, and shutting down a first content when running a second content that is different from the first content while the first content is running.

The exemplary embodiments further include running a content most recently shut down from among contents included in the category when the UI in the category is selected according to a user input. The exemplary embodiments further include running a content executed the most frequently from among contents included in the category, when the UI in the category is selected according to a user input.

The exemplary embodiments further include a display apparatus including a display unit which displays contents; a UI generation unit which generates UIs regarding the contents; and a controller which controls classifying the contents according to categories based on a user history of contents use and displays a UI in each category.

The exemplary embodiments further include a method of controlling a display apparatus, the method including running contents and displaying an image including the contents; classifying the contents according to categories based on a user history of contents use; and displaying a UI in each category.

As described above, there is provided a display apparatus and control method which allows easy access to desired contents when a user wants to utilize various contents through the display apparatus.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 5 is a second flowchart illustrating a control process of the display apparatus according to the exemplary embodiment.

DETAILED DESCRIPTION OF EXEMPLARY EMBODIMENTS

Figure 1:
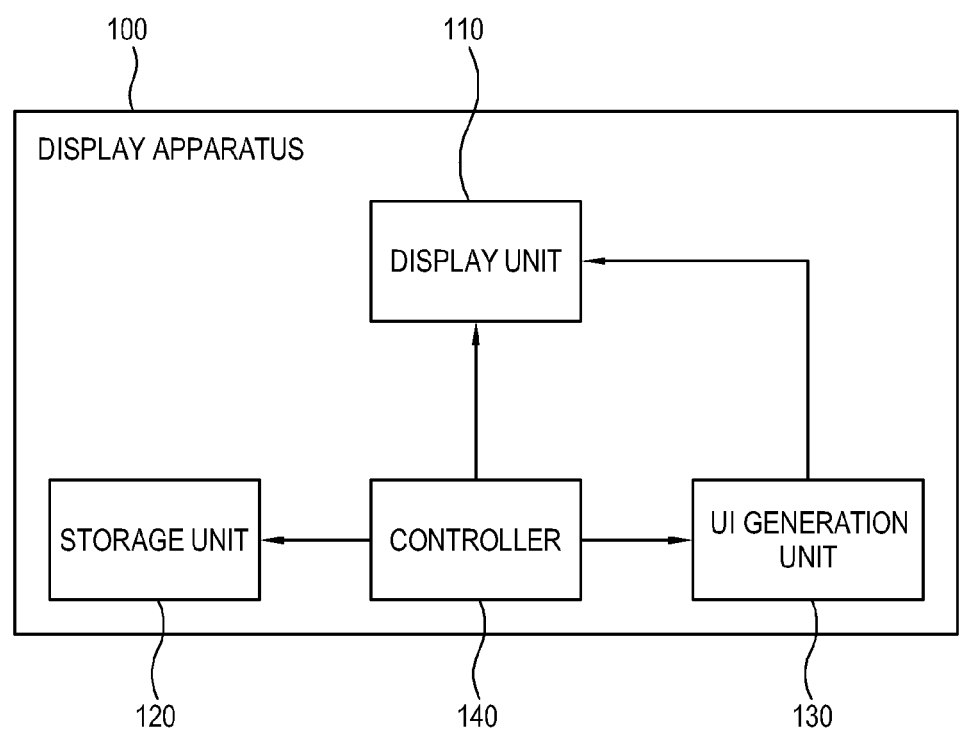
FIG. 1 is a block diagram of a display apparatus according to an exemplary embodiment.

Below, exemplary embodiments will be described in detail with reference to the accompanying drawings so as to be easily understood by a person having ordinary skill in the art. The exemplary embodiments may be embodied in various forms without being limited to the exemplary embodiments set forth herein. Descriptions of well-known parts are omitted for clarity and conciseness, and like reference numerals refer to like elements throughout.

Hereinafter, a display apparatus 100 according to a first exemplary embodiment is described.

FIG. 1 is a block diagram of the display apparatus 100 according to the exemplary embodiment.

As shown in FIG. 1, the display apparatus 100 according to an exemplary embodiment includes a display unit 110, a storage unit 120, a user interface (UI) generation unit 130 and a controller 140. The display apparatus 100 may be configured as a TV that is capable of running various contents.

The display unit 110 displays an image of a content being executed. In addition to broadcast channels, the display unit 110 may display images of various types of contents run by the display apparatus 100 and may display a contents bar including a plurality of UIs, which will be described below. The display unit 110 may include a display panel (not shown) to display images on, e.g., a liquid crystal display (LCD) and a plasma display panel (PDP). A panel driver (not shown) drives the display panel to display images, but is not limited thereto.

The storage unit 120 stores information regarding a content according to control by the controller 140. The storage unit 120 may store information regarding first contents when a second content is executed while the first contents are running. The stored information may include the kind of first contents, a time at which the contents are paused, a screen at a time of pausing the contents, and the like. The storage unit 120 may be configured as a storage device including a nonvolatile memory, e.g., a hard disk drive, embedded in the display apparatus 100, but is not limited thereto.

The UI generation unit 130 generates a UI regarding a content. In particular, the UI generation unit 130 may generate and display on display unit 110 a UI regarding the first contents, which are shut down. The UI displayed on the display unit 110 may include a plurality of UIs which respectively correspond to the first contents, and the UIs may be displayed corresponding to respective categories by classifying the contents by category.

Here, the UIs may be displayed as a thumbnail image which corresponds to a screen at a time when the first contents are shut down. Accordingly, a user may easily recognize a layout of the entire screen presented at the time of shutting down the contents, which correspond to the respective UIs.

The controller 140 controls overall operations of the display apparatus 100. The controller 140 may include a control program, a nonvolatile memory, such as a read-only memory (ROM) storing the control program and a flash memory, a volatile memory, such as a random-access memory which at least part of the stored control program is loaded into, and a microprocessor, such as a central processing unit (CPU) running the loaded control program and a micro-control unit (MCU), which are not shown in FIG. 1.

When receiving input of an instruction to execute the second content which is different from the first contents, through a key input unit (not shown) or a remote controller (not shown) provided on the display apparatus 100, while running the first contents, the controller 140 may run the second content and shut down the first contents being executed. Accordingly, only a single content may be run at a given time.

When the first contents are shut down, the controller 140 controls the storage unit 120 to store the information regarding the first contents which were shut down. As described above, the information stored in the storage unit 120 may include the kind of first contents, a time at which the contents are paused, a screen at a time of pausing the contents, and the like.

Further, when the first contents are shut down, the controller 140 may control the UI generation unit 130 to generate the UI regarding the first contents which have been shut down, for display on the display unit 110. The UI regarding the first contents may be displayed as a thumbnail image which corresponds to a screen at a time when the first contents are shut down, with information such as the kind and title of the contents being presented together.

When executing a third content, different from the first contents and the second content, while the second content is running, the controller 140 may perform control to display together, the UI regarding the first contents and a UI regarding the second content. Accordingly, a history of contents run in the display apparatus 100 may be readily identified.

Figure 2:
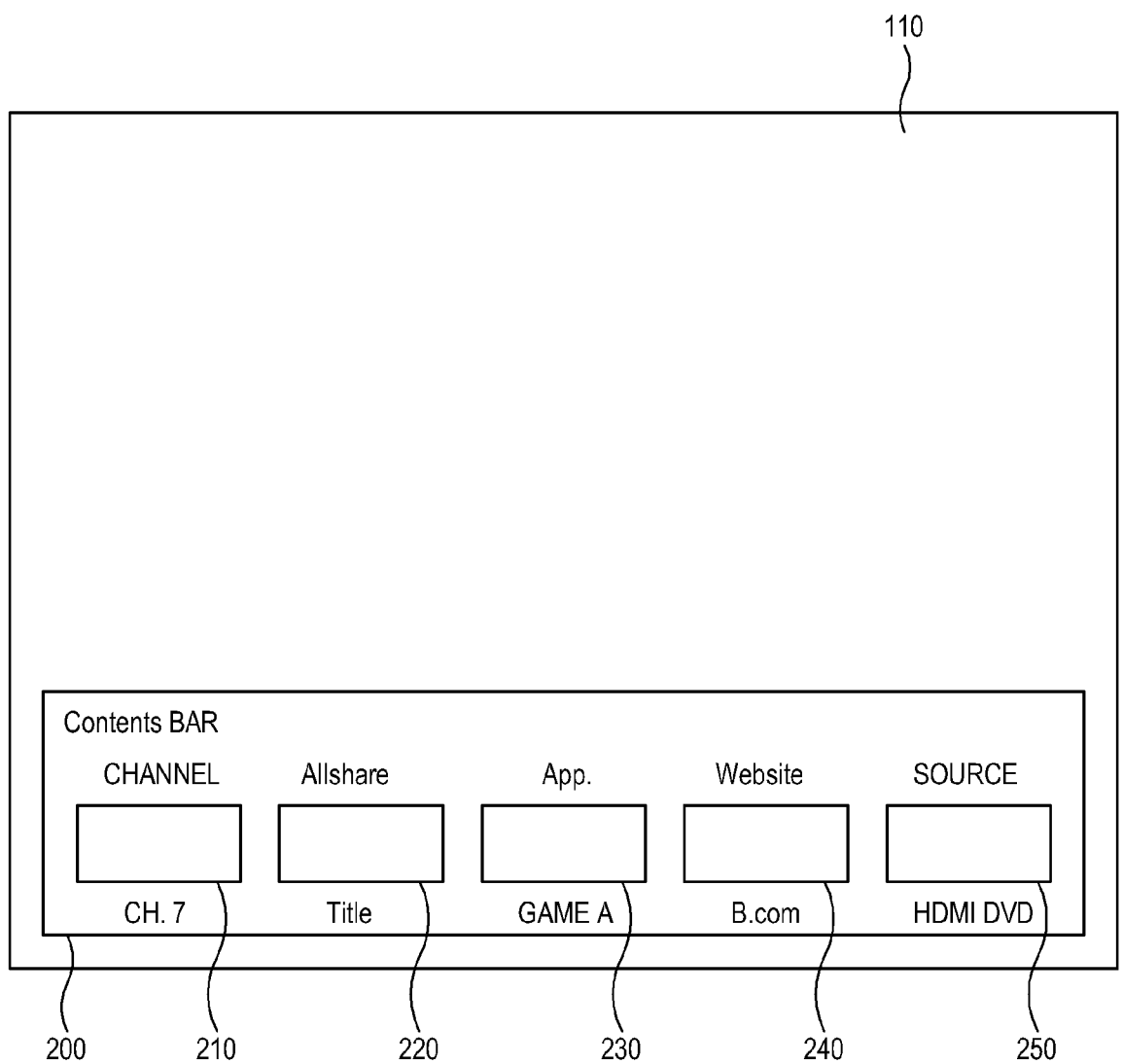
FIG. 2 shows an illustrative screen displaying a plurality of user interfaces by category.

As shown in FIG. 2, UIs corresponding to each category may be inclusively displayed in a contents bar 200. That is, UIs classified by category, e.g., recently viewed channel 210, recently connected Allshare 220, recently used application 230, recently retrieved website 240 and recently connected image source 250, may be displayed. For example, as a broadcast channel, a channel last tuned to based on channel tuning by a tuner is displayed. In multimedia files through Allshare, a last played scene is displayed. A site retrieved the most recently in the history of a web browser is displayed as a website.

As illustrated, a category name of a content, a thumbnail of a screen at a time of shut down and a subtitle of a content may be displayed together. When a user selects a particular UI, a content shut down the most recently or a content executed the most frequently may be run among contents included in the category.

Figure 3:
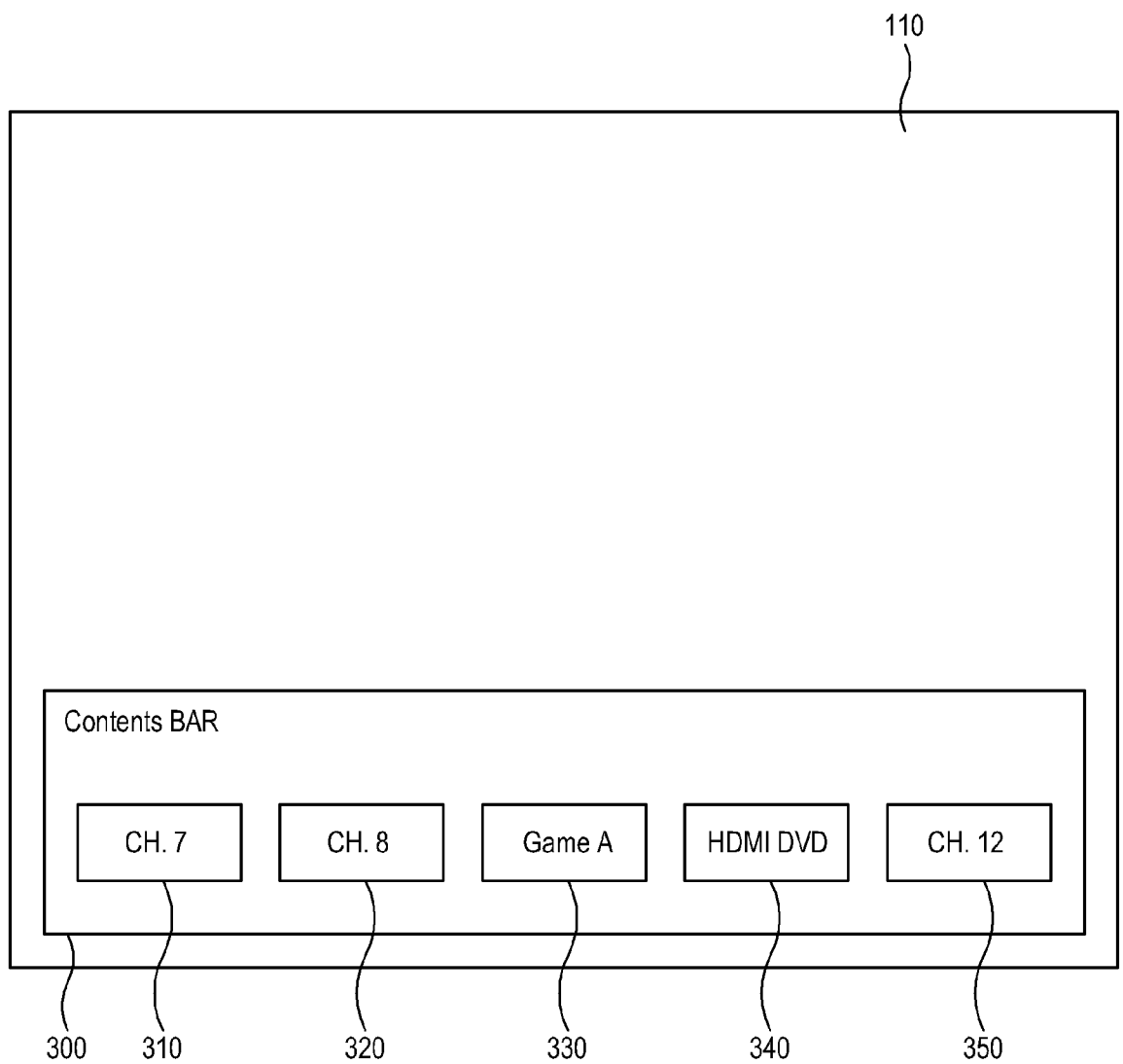
FIG. 3 shows an illustrative screen displaying a plurality of user interfaces in order of latest shut down or execution frequency.

As shown in FIG. 3, UIs respectively corresponding to shut down contents are included in a contents bar 300, being displayed in order of latest shut down. That is, the UIs may be displayed in sequence of channel 7 310, channel 8 320, game A 330, HDMI connected DVD 340 and channel 12 350 in order of latest to earliest shut down contents.

A user may select a UI corresponding to each content through the key input unit or the remote controller to conveniently run the content. Further, when a user pushes a particular button on the key input unit or remote controller, the display apparatus 100 according to an exemplary embodiment may enable immediate execution of a latest run content (channel 7 in FIG. 3). Accordingly, except for a content currently running, a previously executed content is conveniently selected and run, providing convenience to the user.

Alternatively, the controller 140 may control display of a plurality of UIs in the order of execution frequency. That is, as shown in FIG. 3, the UIs corresponding to respective contents may be inclusively displayed in the contents bar 300 in order of highest execution frequency for a particular period of time.

When a user selects a particular UI from among the UIs through the key input unit or remote controller, the controller 140 controls, according to a user input, the running of a content which corresponds to the selected UI. Here, the controller 140 may resume execution of the content from a time of shutting down the previous content. Accordingly, when the user reruns the previously run content after changing a content, the user may conveniently resume the content from a part being run at the time of shut down. In particular, when only a single content is allowed to run due to limitations in hardware, the user may arbitrarily conduct a change of contents.

Hereinafter, a display apparatus 100 according to a second exemplary embodiment is described. Descriptions of the same features as in the first embodiment are omitted for purposes of clarity and conciseness.

A controller 140 classifies contents according to category based on a user history of contents use. The use history corresponds to a list of contents run through the display apparatus 100. The controller 140 controls display UIs in each category on a display unit 110.

Figure 4:
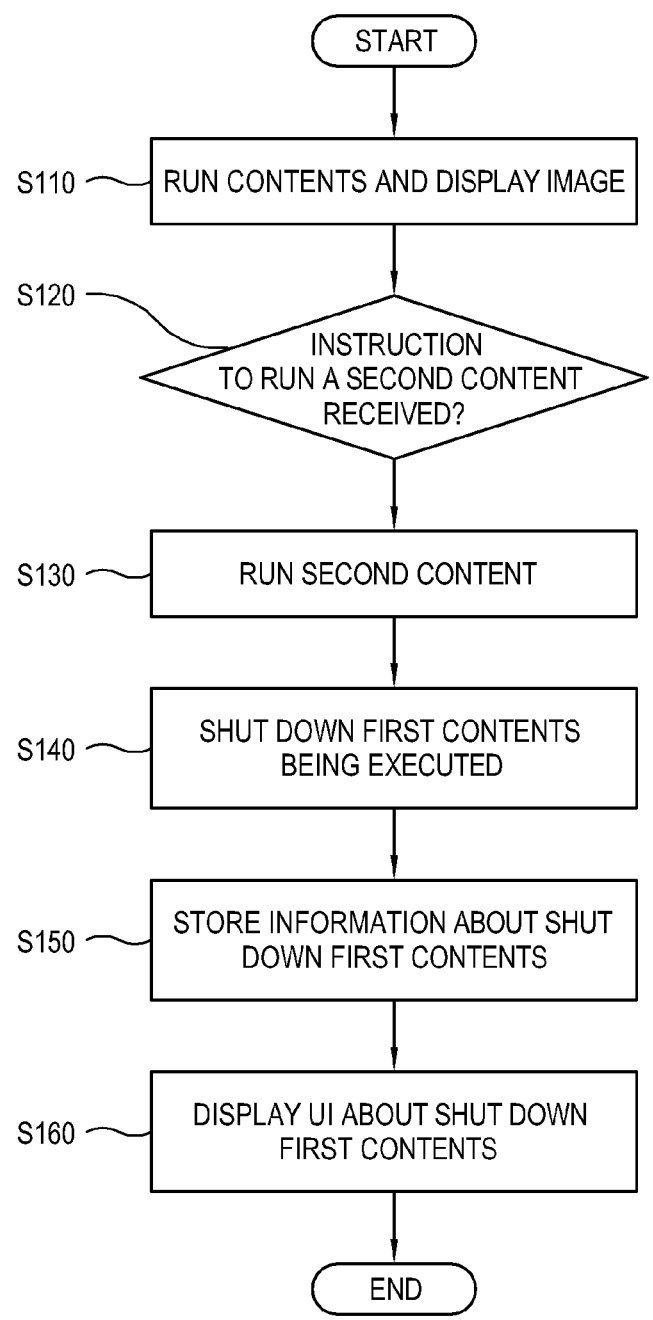
FIG. 4 is a first flowchart illustrating a control process of the display apparatus according to the exemplary embodiment.

FIG. 4 is a first flowchart illustrating a control process of the display apparatus 100 according to an exemplary embodiment.

The display apparatus 100 according to this exemplary embodiment may be used not only for watching broadcasts but for utilizing various contents. The display apparatus 100 executes contents and displays an image including the contents (S110). When receiving input of an instruction from a user (S120) to run a second content, which is different from the first contents being executed, the display apparatus 100 runs and displays the second content according to the user input (S130) and shuts down the first contents being executed (S140). Accordingly, only a single content may be run at a given time.

When the first contents are shut down, the display apparatus 100 stores information about the shut down first contents (S150) which have been shut down. Here, the stored information may include the kind of first contents, a time at which the contents are paused, a screen at a time of pausing the contents, and the like. The information may be stored in a storage device including a nonvolatile memory, e.g., a hard disk drive, embedded in or communicating with the display apparatus 100.

The display apparatus 100 generates and displays a UI regarding the shut down first contents (S160). Here, the displayed UI may include a plurality of UIs which respectively correspond to the first contents, and each of the UIs may be displayed as a thumbnail image which corresponds to a screen at a time when the first contents are shut down, with information such as the kind and title of the contents being presented together.

When executing a third content, different from the first contents and the second content, while the second content is running, the display apparatus 100 may display together the UI regarding the first contents and a UI regarding the second content. Accordingly, a history of contents run through the display apparatus 100 may be readily identified.

The UIs may be displayed in order of latest shut down or execution frequency, which has been described with reference to FIG. 3.

A user may select a particular UI from among the displayed UIs and run a content which corresponds to the selected UI. Here, the display apparatus 100 may resume execution of the content from a time of shutting down the content. Accordingly, when the user reruns the previously used content after changing a content, the user may conveniently resume the content from a part of the content that was being run at the time of shut down. In particular, when only a single content is allowed to run due to limitations in hardware, the user may arbitrarily conduct a change of contents.

FIG. 5 is a first flowchart illustrating a control process of the display apparatus 100 according to an exemplary embodiment.

The display apparatus 100 executes contents and displays an image including the contents (S210). The display apparatus 100 classifies the contents according to a category based on a user history of contents use (S220). The use history corresponds to a list of contents run through the display apparatus 100.

The display apparatus 100 displays UIs in each category (S130). An illustrative example of displaying UIs has been described above with reference to FIG. 2.

When a UI in a particular category is selected according to a user's input, a content that was most recently shut down may be run among contents included in the category. Alternatively, a content executed that is most frequently may be run among contents included in the category.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A control method to control a display apparatus, the method comprising:
 executing a plurality of applications to execute and display contents on a screen of the display apparatus, the contents being executed using the plurality of applications;
 storing information about the executed plurality of applications; and
 displaying a user interface comprising a plurality of menu items corresponding to the executed plurality of applications based on the stored information, the plurality of menu items providing information of the executed plurality of applications that are different applications from each other,
 wherein at least one of the plurality of menu items comprises a thumbnail image of the screen when one of the contents was displayed,
 wherein the plurality of menu items are arranged in order of recently executed applications, and
 wherein the different applications comprise a recently viewed broadcasting channel, a recently executed file, and a recently executed application.

2. The control method according to claim 1, further comprising resuming the executed content in response to receiving user input selecting the thumbnail image.

3. The control method according to claim 2, wherein the resuming the executed content comprises resuming the content at a point when the content is lastly executed.

4. The control method according to claim 1, further comprising classifying the plurality of menu items comprised in the user interface by category.

5. The control method according to claim 1, wherein the display apparatus comprises a television.

6. The control method according to claim 1, wherein the displaying of the user interface comprises displaying the user interface to provide combined information of different types of applications.

7. The control method according to claim 6, wherein the different types of applications comprise at least two among downloadable applications (APPs), World Wide Web (WWW) browsers, WWW websites, games, email, and social networking services (SNS).

8. The control method according to claim 1, wherein the displaying the user interface comprises displaying the user interface as a bar shape while the contents are being displayed on the display apparatus.

9. The control method according to claim 8, wherein the display apparatus comprises a television having two vertical sides parallel to each other in a first direction, and two horizontal sides parallel to each other in a second direction perpendicular to the first direction, and
 the displaying of the bar-shaped user interface comprises displaying the bar-shaped user interface adjacent to and parallel to one of the horizontal sides.

10. The control method according to claim 1, wherein the displaying the user interface comprises displaying the user interface in response to receiving a user input for displaying the user interface.

11. The control method according to claim 1, wherein at least some part of the plurality of menu items are arranged in order of execution frequency.

12. A display apparatus, comprising:
 a display;
 a storage; and
 a processor configured to:
  execute a plurality of applications to execute and display contents on a screen of the display, the contents being executed using the plurality of applications,
  store information about the executed plurality of applications, and
  display a user interface comprising a plurality of menu items corresponding to the executed plurality of applications based on the stored information, the plurality of menu items providing information of the executed plurality of applications that are different applications from each other,
 wherein at least one the plurality of menu items comprises a thumbnail image of the screen when one of the contents was displayed,
 wherein the plurality of menu items corresponding to the executed plurality of applications are arranged in order of recently executed applications, and
 wherein the different applications comprise a recently viewed broadcasting channel, a recently executed file, and a recently executed application.

13. A non-transitory computer readable recording medium having stored thereon a program which, when executed, causes a display apparatus to perform a method comprising:
 executing a plurality of applications to execute and display contents on a screen of the display apparatus, the contents being executed using the plurality of applications;
 storing information about the executed plurality of applications; and
 displaying a user interface comprising a plurality of menu items corresponding to the executed plurality of applications based on the stored information, the plurality of menu items providing information of the executed plurality of applications that are different applications from each other,
 wherein at least one of the plurality of menu items comprises a thumbnail image of the screen when one of the contents was displayed,
 wherein the plurality of menu items corresponding to the executed plurality of applications are arranged in order of recently executed applications, and
 wherein the different applications comprise a recently viewed broadcasting channel, a recently executed file, and a recently executed application.

* * * * *